United States Patent [19]

Faroudja

[11] 3,764,739

[45] Oct. 9, 1973

[54] COLOR VIDEO RECORDING AND PLAY BACK SYSTEM

[76] Inventor: Yves C. Faroudja, 1157 Regia Ct., Santa Clara County, Calif. 94087

[22] Filed: Jan. 25, 1971

[21] Appl. No.: 109,535

[52] U.S. Cl. .......................... 178/5.4 CD, 178/6.6 A
[51] Int. Cl. .......................... H04n 5/78, H04n 9/02
[58] Field of Search .................. 178/5.4 CD, 6.6 A, 178/5.4

[56] References Cited

UNITED STATES PATENTS

| | | | |
|---|---|---|---|
| 3,723,638 | 3/1973 | Fujita | 178/5.4 CD |
| 2,921,976 | 1/1960 | Johnson | 178/6.6 A |
| 3,614,305 | 10/1971 | Hidaka et al. | 178/5.4 CD |
| 3,581,007 | 5/1971 | Cassagne et al. | 178/5.4 CD |
| 3,424,861 | 1/1969 | Delvaux | 178/5.4 CD |

*Primary Examiner*—Howard W. Britton
*Attorney*—Harry E. Aine and William J. Nolan

[57] ABSTRACT

A color video recording system wherein the incoming video signal is separated into chroma and luminance signals by a comb filter and the chroma signal thereafter recorded on the lower end of the RF spectrum of the record medium and the luminance recorded on the upper end of said RF spectrum is disclosed. Systems for meeting NTSC and PAL standards and utilizing quadrature modulation and line sequential modulation, either AM or FM, for transcoding the chroma signal are described.

17 Claims, 17 Drawing Figures

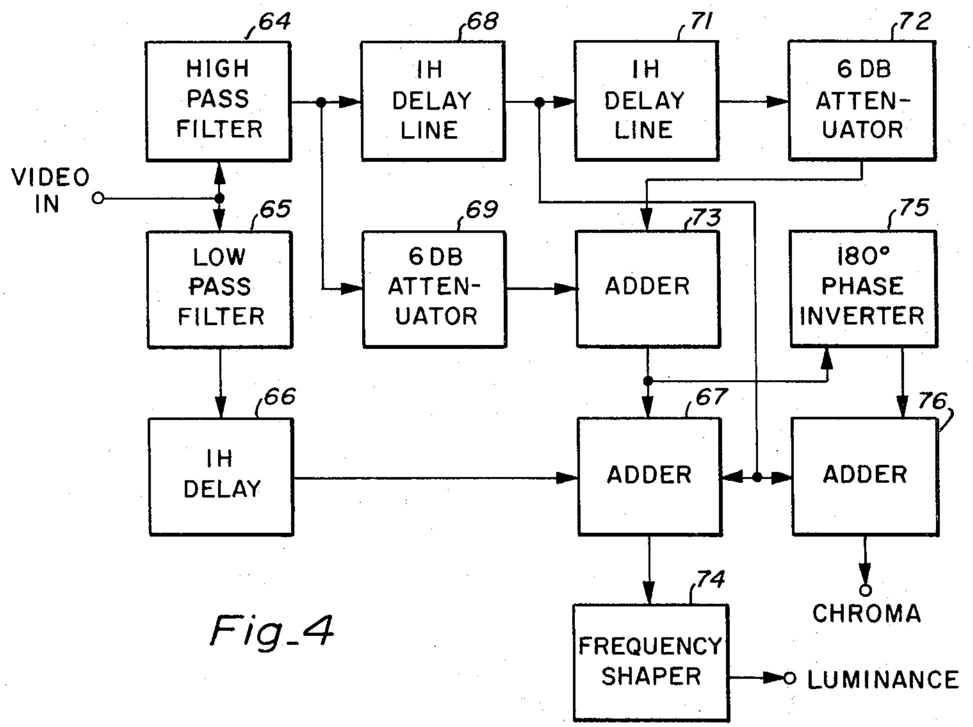
Fig_4
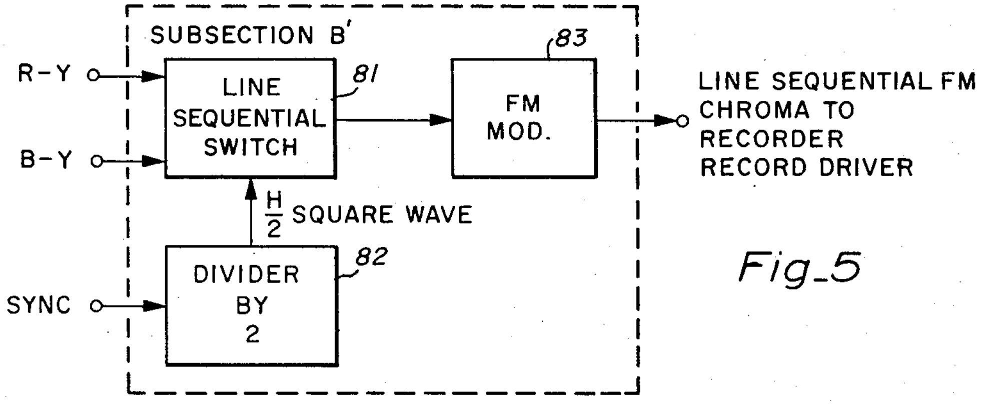
Fig_5
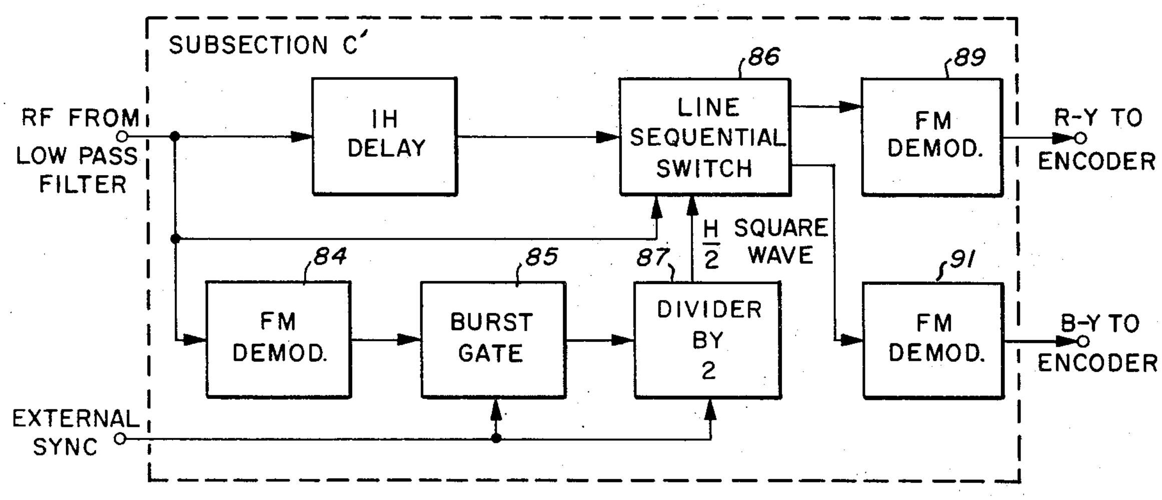

COLOR VIDEO RECORDING AND PLAY BACK SYSTEM

BACKGROUND OF THE INVENTION

All video recorders, e.g. quadruplex, helical scan, and disc recorders, utilize rotating components to record and play back television signals, and, therefore, time base instability is introduced because of the failure of these components to rotate at a perfectly smooth rate. Monochrome playback units display this error in the form of horizontal jitter. However, a more noticeable effect is produced in the playback of color quadrature-modulated signals; in the NTSC system (the U.S. standard), the hue is subjectively altered; in the PAL system (the European standard), the horizontal jitter effect is reduced but is replaced by other undesireable effects known as "Hanover blinds" and saturation errors.

In order to satisfy these subjective requirements, and to maintain proper frequency relationship between subcarrier and horizontal scanning rates (as required by the FCC and CCIR), it is generally agreed that a time base accuracy of 4*ns* is necessary, for both NTSC and PAL signals.

Heretofore, color recorders capable of meeting these requirements have utilized time base correction apparatus that depend upon electrically controlled variable delay lines to eliminate displacements in the playback signal. These devices must not reduce the luminance bandwidth as it would have the effect of degrading the subjective picture sharpness and resolution.

This time base correction is generally performed in two steps: a first step comprises a reduction of the time base error through a variable delay line (such as the known "Amtec") which allows the system to meet monochrome specifications. A second step comprises reduction through another variable delay line (such as the known "Colortec" system) which is necessary for refining the time base accuracy until proper color phasing is obtained. These devices are both complex and expensive and are not free from differential phase and gain errors.

Another common problem encountered in color video recording techniques is known as "moire" which results from different interferences between the FM (or PIM) carrier used for recording the video information and the sidebands due to the color subcarrier. Such an effect obliges recorder manufacturers to adopt high carrier frequencies for minimizing this interference.

Another problem known as "banding" is common among quadruplex recorders and is due to the fact that the time base correction is applied only once a line, towards the beginning of the horizontal scanning. At the end of the scanning, errors due to the difference between heads and time base variations become very visible and follow a repetitive pattern. Expensive devices, known as "Auto chroma" and "velocity compensator," are capable of correcting these errors, at the cost of circuit complexity.

Helical-scan recorder manufacturers have attempted to reach broadcast quality performances, but these recorders fall generally into one of the following two categories: 1) the cost is low, but the performances are reduced, the luminance bandwidth is limited, differential phase and gain are marginal, and editing abilities are incomplete; 2) the performances approach broadcast standards, but complexity and cost are similar to those of quadruplex recorders.

BRIEF SUMMARY OF THE INVENTION

The invention is a color video recording system wherein standard NTSC or PAL signals are transcoded into a new standard more readily accepted for recording by video recorders and recovered in playback and transcoded back to its original NTSC or PAL form, without noticeable degradation of the original quality so as to clearly meet broadcast standards.

This invention comprises a video signal processing circuit including a comb filter for separating luminance and chroma information prior to recording without noticeable luminance bandwidth reduction, transcoding the chroma from NTSC or PAL to a new color code in either quadrature or line sequential form, and using the lower end of the magnetic media RF spectrum for chroma recording. In playback the recording is transcoded to NTSC or PAL by making use of separate chroma and luminance recovery through high and low pass RF filters, chroma transcoding to NTSC or PAL, and addition of the new chroma to the recovered and properly timed luminance.

In one embodiment the chroma is recorded directly without first transcoding; in another embodiment heterodyne frequency transposition is used prior to recording the chroma signal.

Various specific forms of comb filters and transcoders operating in the quadrature and line sequential modes are disclosed.

BRIEF DESCRIPTION OF VIEWS OF THE DRAWINGS

FIG. 4 is a block diagram of another form of comb filter useful in the input processing unit.

FIG. 5 is a block diagram of an FM line sequential system which may be employed in lieu of quadrature modulation.

DESCRIPTION OF THE PREFERRED EMBODIMENTS

Figure 1:
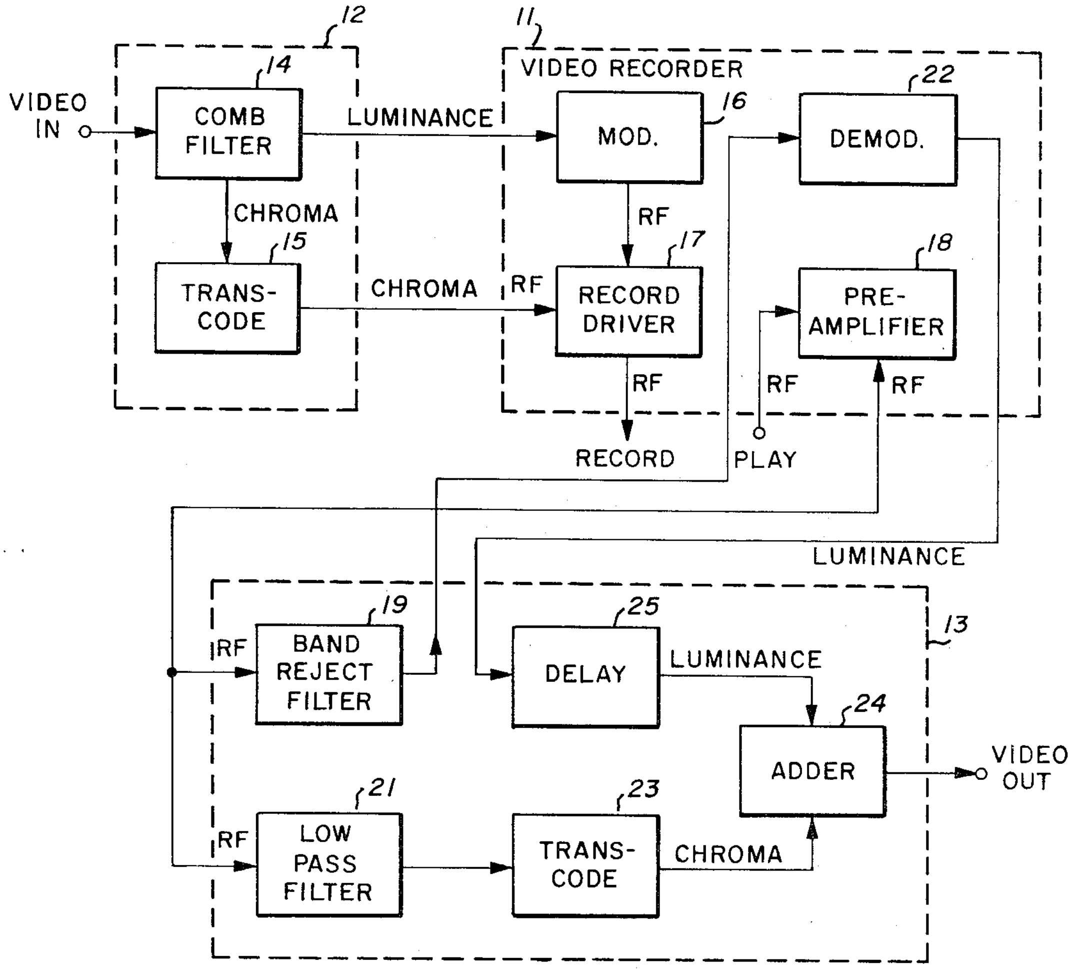
FIG. 1 is a block diagram of the present invention including the video signal processing units, recording and play back, and associated video recorder unit.

Referring now to FIG. 1, this novel system comprises three basic sections, the video recorder device 11, the recording input processing unit 12 for processing the standard form of incoming video signal prior to recording the new form of signal on the magnetic medium in the video recorder section 11, and the play back processing unit 13 for receiving the recorded signal from the video recorder and reconstituting the original form of video signal for transmittal to the utilization circuits which may, for example, be a broadcast transmitter.

Signal processing unit 12 separates the luminance signal from the chroma signal in the incoming video signal by means of a comb filter 14 and then transcodes the chroma in transcoder circuit 15 into the desired quadrature or line sequential modulation system. The outputs of the input processing unit 12 are a luminance signal to be applied to the input of the conventional modulation circuit 16 in the recorder and a chroma carrier to be added at a low level at the input of the record driver 17 for recording on the low end of the RF spectrum of the record medium. The luminance information is transmitted to the record driver 17 from the modulation circuitry 16 for recording on the upper end of the RF spectrum.

The play-back section 13 receives the RF playback output from the recorder preamplifier 18, separates the chroma from the luminance information by means of a band-reject filter 19, and a low pass filter 21, sends back to the recorder 11 the output of its high pass filter 19 for luminance demodulation in demodulator 22, transcodes the chroma information to the proper NTSC or PAL subcarrier in transcoder 23, and then adds it in adder 24 to the luminance received from the demodulator 22 of the recorder after the proper delay correction by delay circuit 25.

This invention enables broadcast monochrome recorders to reach color broadcast quality by providing the following characteristics.

1. No noticeable degradation of the luminance bandwidth by utilizing a comb filter for separating luminance from chroma information.

2. Low moire level due to the fact that the color carrier is recorded at a lower frequency and at a lower level than the luminance carrier, the luminance carrier acting as a bias versus the color subcarrier and therefore linearizing the subcarrier recording process, thus preventing the generation of unwanted beat patterns.

The low moire level also results from the fact that luminance and chroma are recorded separately, and more latitude is obtained in the choice of luminance and chroma carrier frequencies and amplitudes for minimizing beat patterns.

To minimize beat patterns, the subcarrier frequency is chosen to be a) lower than the lower end of the lower modulation sideband of the luminance carrier and b) equal to an odd multiple of a quarter of the horizontal scanning line frequency, i.e., $F_{SC} = 2N+1/4\ F_H$.

3. Small differential phase and differential gain errors due to the fact that, as luminance and chroma informations are recorded separately, the recording process does not allow one to influence the other; thus differential gain and phase errors are only introduced during input and output transcoding where they are easily reduced.

4. Low sensitivity to time base errors; when the transcoding is effected to a quadrature modulated subcarrier, the hue information is carried by the phase of the subcarrier; if the subcarrier frequency is low, the effect on the hue of a given time base error will be proportionally lower; for example a **10*ns*** error will produce a 10° error on a 3.58 MHz subcarrier, an error quite noticeable, but only a 3° error on a 1MHz subcarrier; the same effect applies to "banding."

When the transcoding is effected to a line sequential subcarrier, the time base errors have a negligible effect on the picture color content, as demonstrated in the past by the experience of the "Secam" color system.

This invention also results in reducing the overall recording process cost by: a. eliminating color variable delay line time base correctors (such as "Colortec"), auto chroma and velocity compensation systems; b. reducing the severity of the requirements of the modulator - demodulator, preamplifiers and equalizers of the recorder, and c. permitting the use of less expensive devices such as helical - scan recorders for color broadcast use, provided these units are capable of monochrome broadcast performances.

Another application of this invention is to disc recorders. These recorders are presently used in conjunction with a color variable delay line or a similar device for providing proper information; a periodic 180° phase switching is also necessary in stop action, slow motion, or elapse time play modes for keeping subcarrier and scanning line frequencies in the proper relationship when the same field is repeated twice or more in playback. Such a delay line and 180° switching become unnecessary when the present invention is used in conjunction with a disc recorder.

In the following more detailed descriptions, well known circuit components such as buffers, amplifiers of constant gain, and phase and amplitude adjustments which do not play a fundamental part in the understanding of the system are omitted for clarity.

Figure 2:
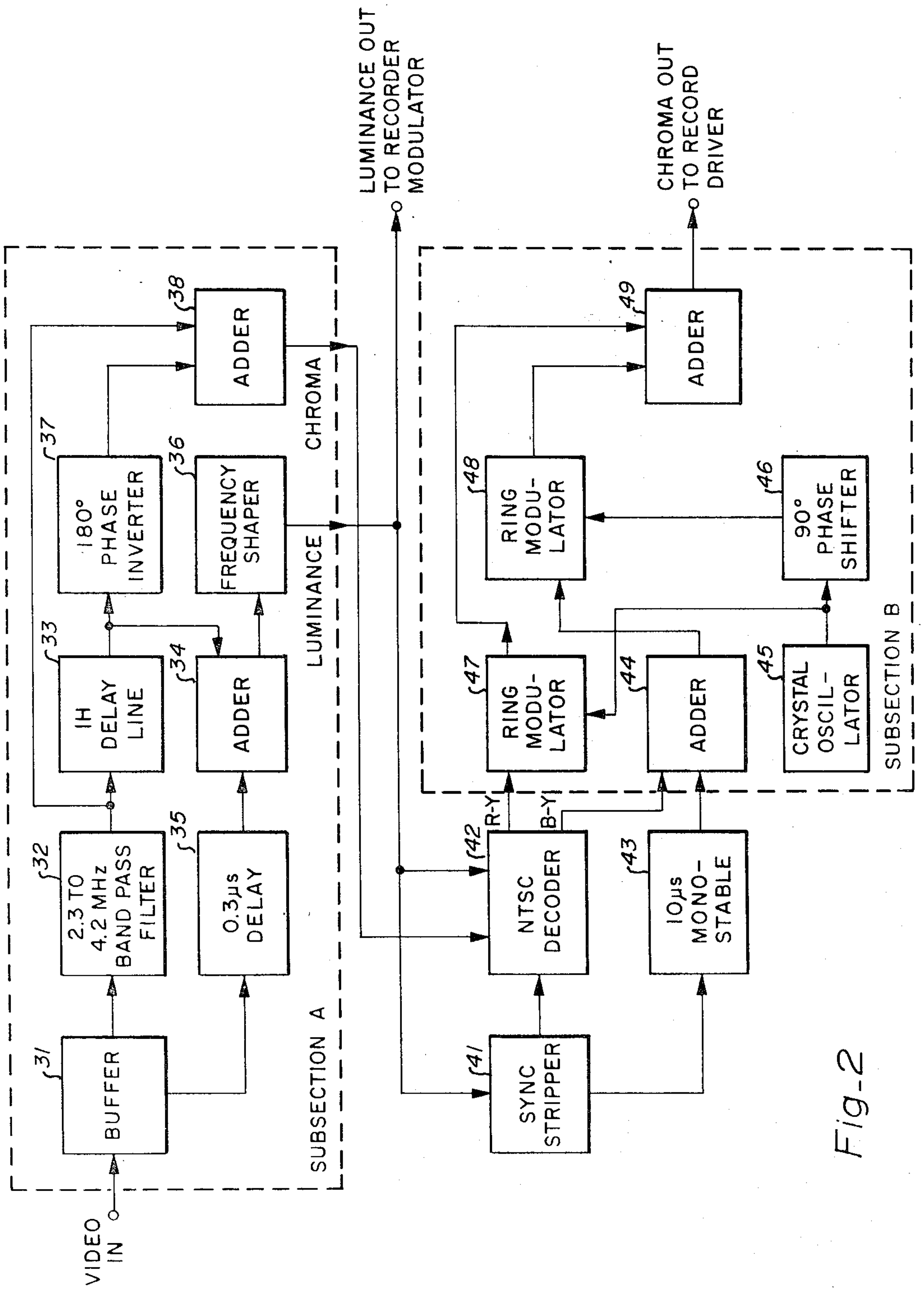
FIG. 2 is a block diagram of the input processing section employed in an NTSC system and utilizing quadrature modulation in the transcoder section.

In FIG. 2 there is shown the block diagram of one preferred form of record processing system 12 shown broadly in FIG. 1, this system comprising a relatively simple comb filter circuit 14 and providing quadrature modulation signals from the transcode circuit 15 which are compatible with the NTSC system standards.

The incoming video signal to be recorded is applied to an input buffer 31. One of the outputs of the buffer 31 is applied to a band pass filter 32 which selects the modulated NTSC subcarrier and the luminance frequencies located in the 2.3 to 4.2 MHz band. The output of this filter 32 is applied to a delay line 33 which delays the signal by precisely the duration of one horizontal scanning line. The adder 34 received at one of its inputs the composite video signal at full bandwidth coming from the input buffer 31, after a 0.3*u* sec delay introduced by the delay circuit 35 for matching the delay of band pass filter 32, and at the other input the delayed NTSC subcarrier and luminance signal.

The color subcarrier frequency is equal to an odd multiple (455) of half the horizontal scanning frequency and, therefore, the subcarriers prior and after the one line delay line 33 are in phase opposition. Thus the subcarriers cancel in adder 34; the output of adder 34 is free of subcarrier information and contains only luminance signals. Precise tailoring of the amplitudes and phases of the signals at the inputs of the adder 34 are desired for proper chroma elimination.

The spectrum of the output of the adder 34 presents a +6*db* boost on the luminance frequencies located between 2.3 and 4.2 MHz since these frequencies have been added from two successive lines. The frequency shaper network 36 is utilized to reduce by 6*db* the amplitude of these frequencies without introducing noticeable phase errors in these areas.

If desired, the subcarrier amplitude may be further reduced by means of a narrow-band (500KHz) and low Q notch filter (not shown). Such filtering does not affect the overall K factor and rise-time, since most of the camera encoders, which in most instances are providing the input, have such rejectors.

The output of the one line delay line 33 is also inverted by 180° in an amplifier 37 of gain −1 and then applied to the adder 38, which also received at its other input the undelayed 2.3 to 4.2 MHz video frequencies from filter 32. These two inputs are properly tailored to be of equal phase and amplitude as far as the subcarrier is concerned, and in phase opposition as far as the luminance high frequencies are concerned. The output of the adder 38 is therefore the chroma signal free of luminance frequencies.

The luminance signal is then sent to the recorder modulator input, where it is processed exactly as a monochrome signal for recording on the magnetic medium. It is also sent to a sync stripper 41 and applied, together with the chroma information, to a NTSC decoder 42 of standard and well-known design producing demodulated R–Y and B–Y output information. As an alternative, another form of NTSC decoder delivering I and Q outputs instead of R–Y and B–Y may be used.

The transcoder 15 utilizes a quadrature modulator of a type similar to those in use in NTSC coders, but operating at a lower frequency (on the order of 1MHz instead of 3.58MHz).

The synchronization pulse coming from the sync stripper 41 triggers a 10*us* monostable circuit 43, this 10*us* pulse output being added in the adder 44 to the B–Y information in order to provide a 10*us* color reference burst on the new quadrature modulated signal. Such a long burst, extending nearly through the entire blanking interval, is desired to provide proper information in playback relative to the phase of a relatively low frequency subcarrier.

The R–Y output and the output of the adder 44 are modulated in quadrature in a carrier-suppressed mode by the sine-wave outputs of the crystal oscillator 45 and the 90° phase shifter 46 into two ring modulators 47 and 48. The outputs of these modulators are in quadrature and are provided via adder 49 to the recorder record driver circuit 16.

Figure 3:
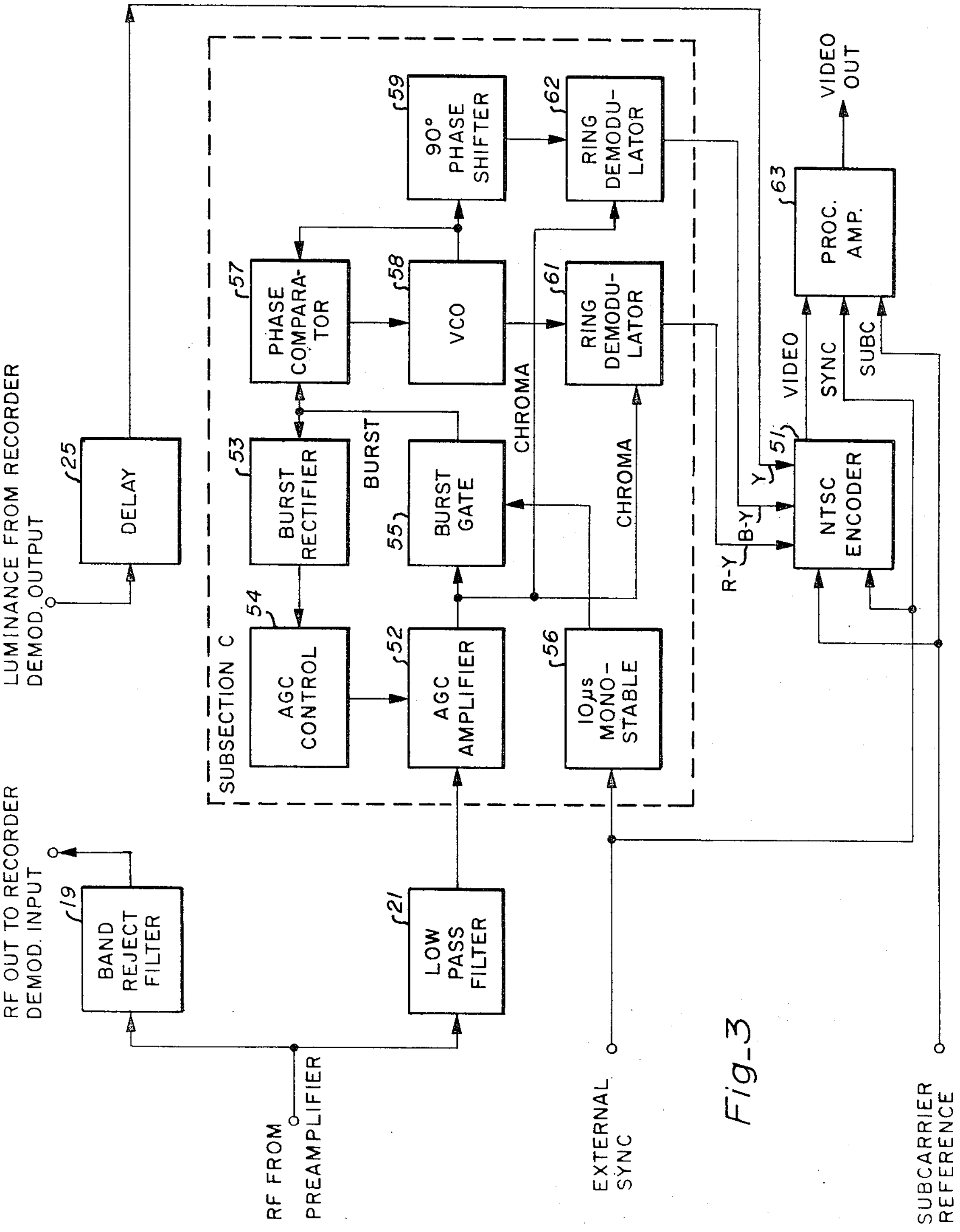
FIG. 3 is a block diagram of the play back section used with the system of FIG. 2 which utilizes quadrature demodulation for transcoding back to NTSC.

Referring now to the detailed playback section 13 shown in FIG. 3, the RF signal coming from the recorder preamplifier 18 is applied, prior to any limiting, to a band reject filter 19 which reduces the amplitude of the chroma frequencies without noticeably affecting the group delay in the luminance path. The output of the band reject filter 19 is then sent back to the recorder where it is demodulated in demodulator 22 as if it were a monochrome signal. The luminance recovered from the recorder demodulator output is then transmitted to the NTSC encoder 51 after proper delay matching via delay circuit 25 with the chroma path.

The RF from the preamplifier 18 is also sent to the low pass filter 21 which eliminates luminance carrier and sidebands from the chroma path. The output of the low pass filter 21 is then sent to a quadrature demodulator circuit where it is demodulated. The AGC amplifier 52 maintains the chroma level constant by using the burst amplitude as a reference via burst rectifier 53 and AGC control circuit 54, and acts with a few lines time constant. The color burst is gated via gate 55 by the output of a 10*us* monostable circuit 56 triggered by the sync pulse coming from an external reference sync generator (not shown).

The burst is also used as a phase reference in a phase-lock loop including a phase comparator 57 and a voltage controlled oscillator 58. The phase lock operates either in a single line basis or with 5 to 6 lines time constant. The outputs of the VCO 58 and the 90° phase shifter 59 are used with ring demodulators 61 and 62 to quadrature-demodulate the chroma signal. The R–Y and B–Y outputs are then applied to the NTSC encoder 51, whose output is processed in a processing amplifier 63 which delivers a standard NTSC output signal to the utilization circuit.

The processing amplifier not only reshapes burst, sync pulse and video, but also functions to eliminate from the vertical and horizontal blanking intervals unwanted chroma.

Referring now to FIG. 4 there is shown an input video signal processing circuit similar to that shown in FIG. 2 with a more elaborate form of operation. Although simpler, the circuit of FIG. 2 results in a vertical displacement of the chroma information one scanning line height relative to the luminance information. Such an error is generally not perceptible, but it is totally eliminated in the comb filter of FIG. 4.

In FIG. 4, the input video signal is applied to a pair of complementary filters, the high pass filter 64 with a lower cut off frequency of 2.3 MHz and a low pass filter 65 with a high end cut - off at 2.3 MHz. The complimentary filters are such that, if their outputs were added, the video input signal would be reconstituted with very slight differences from the input signal and with a good K factor. The low frequency luminance output of low pass filter 65 is passed to the one scanning line delay circuit 66 with a bandwidth of 2.3 MHz and the low frequency luminance output is sent to one input of adder 67.

The chroma information and the high frequency portion of the luminance appears at the output of filter 64 to the one scanning line delay circuit 68 and the 6*db* attenuator 69. In this circuit, the chroma is to be obtained by averaging over three successive scanning lines to thereby avoid the one line delay produced in the system of FIG. 2. The output of delay line 68 is sent to a second one scanning line delay circuit 71, the output of which is coupled to a 6*db* attenuator 72.

The outputs of attenuators 69 and 72 are sent to an adder circuit 73 to obtain an output which is an average of two signals spaced two lines apart, e.g. a first and third line signal are combined for averaging. The chroma and high frequency luminance signal output of adder 73 is added in adder 67 to the full video signal from delay circuit 66 as well as to the one line delayed chroma and high frequency luminance from delay line 68. As noted above for FIG. 2, the two subcarrier inputs are in phase opposition and cancel in the adder 67 and its output contains only luminance information. This luminance information above 2.3 MHz is 6*db* too high due to the addition of two successive lines and the frequency shaper 74 is utilized to lower this luminance frequency to its initial amplitude.

The chroma and high frequency luminance output from adder 73 is phase inverted in 180° phase inverter 75 and is then added in adder 76 to the output from delay line 68. Since the two inputs are in phase with respect to the chroma and out-of-phase with respect to the luminance, the output consists only of the chroma and is free of luminance.

It is to be noted that in this comb filter, the chroma output results from the averaging of the chroma from the second line with the average of the chroma from lines one and three in every series of three successive lines, and is very similar to the chroma of line two. The luminance output is very similar to the luminance of line two in any series due to the one line delay and the averaging over three successive lines. The vertical resolution for the system of FIG. 4 is improved over that of the system of FIG. 2.

Referring now to FIG. 5, there is shown an embodiment of the invention wherein the record and playback processing circuits utilize line sequential FM type modulation and demodulation. The R–Y and B–Y signals from the NTSC decoder (see FIG. 2) are applied to a line sequential switch 81 which is actuated by the square wave output of a flip-flop circuit 82 operating responsive to the horizontal sync pulse. The switch 81 therefore selects R–Y for even scan lines and B–Y for odd scan lines for transmittal to the FM modulator circuit 83. The output of modulator 83 is line sequential FM chroma which is sent to the record driver of the recorder to be recorded on the lower end of the RF spectrum of the magnetic medium, i.e., tape or disc. This line sequential technique produces insensitivity to time base errors and ease in operating in conjunction with a recorder utilizing head switching between active scanning lines of the picture.

In playback, the RF from the low pass filter (see FIG. 3) is passed to an FM demodulator 84, the output of demodulator 84 being sent to a burst gate 85 which is triggered by the external sync. The burst gate 85 permits the line sequential switch 86 to distinguish between the R–Y and the B–Y signal. The B–Y line has, during the back porch interval, a burst of DC level which is about 40 percent grey level and which corresponds to the demodulated color burst present on the NTSC picture prior to transcoding in the record section. The R–Y line does not have such a burst, so this burst is used to reset the flip-flop circuit 87. Therefore a square wave output is produced to operate switch 86 at half the scanning line rate to alternately select the B–Y and R–Y lines.

The line sequential switch receives the RF signal directly from the low pass filter and then the RF delayed one scanning line from delay circuit 88. The R–Y in FM form is transmitted to FM demodulator 89 where it is demodulated and the B–Y signal sent to the FM demodulator 91 and the demodulated output sent to the NTSC encoder.

The FM demodulator may utilize a clamp after the FM demodulation during the blanking interval; the clamp output is D.C. coupled to the encoder.

It should be understood that other known methods for line identification may be used in lieu of the one described in detail above.

Figure 6:
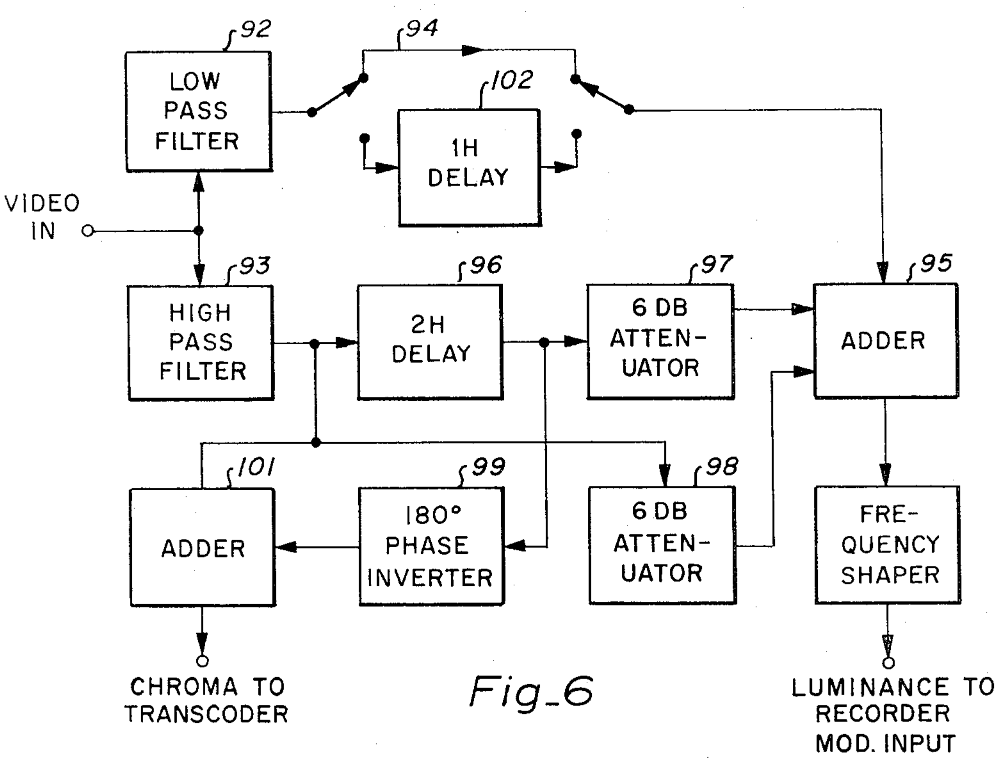
FIG. 6 is a block diagram of the comb filter in the signal input processing unit used in quadrature modulation system under PAL standards.

Referring now to FIG. 6 there is shown a system suitable for the PAL system (The European standard) as distinguished from the NTSC system described in the above embodiments, and the NTSC decoders and encoders are replaced by PAL decoders and encoders. The comb filter for this PAL system comprises the low pass filter 92 and the high pass filter 93 which are complimentary filters. Their cut-off frequency is 3.2 MHz. The luminance signal output of the low pass filter is transmitted via lead 94 directly to one input of adder 95.

The output of the high pass filter 93, which is chroma and high frequency luminance, is transmitted to a two line delay circuit 96 which functions to delay the signal two scanning lines. The output of delay circuit 96 is sent via 6 *d*B attenuator 97 to a second input of adder 95 while the non-delayed output of filter 93 is sent via 6 *db* attenuator 98 to the third input of adder 95. Thus the two inputs to adder 95 from attenuators 97 and 98 comprise the average of the signals spaced apart two lines, while the other input is the low frequency luminance from filter 92. With properly matched inputs in amplitude and phase, the output of adder 95 is luminance free of chroma.

The output of delay line 96 is also applied via 180° phase inverter 99 to one input of adder 101, the other input of adder 101 having the chroma and high frequency luminance applied directly from the filter 93. The high frequency luminance signals cancel and the chroma signal is sent to the transcoder.

As an alternative method, a one scanning line delay may be introduced into the low frequency luminance path prior to the addition in adder 95 by the one line delay circuit 102. This places recovered chroma and luminance information in the proper vertical phasing.

FIG. **7*a*** shows the record spectrum for the NTSC system in the high band standard when the transcoding utilized is the quadrature or the AM line sequential system. The frequency of the color carrier is 1.2 MHz, the color sideband width is on the order of 1MHz, the frequency of the luminance carrier varies between 7.9 and 10 MHz, and the luminance sideband width is 4.2MHz.

The spectrum of FIG. **7*b*** is that for the NTSC system in the high band when the transcoding used is the FM line sequential system. The luminance frequency band is the same as spectrum a and the chroma carrier varies between 2 and 2.5 MHz and the chroma sideband width is 1.2MHz.

Figure 7:
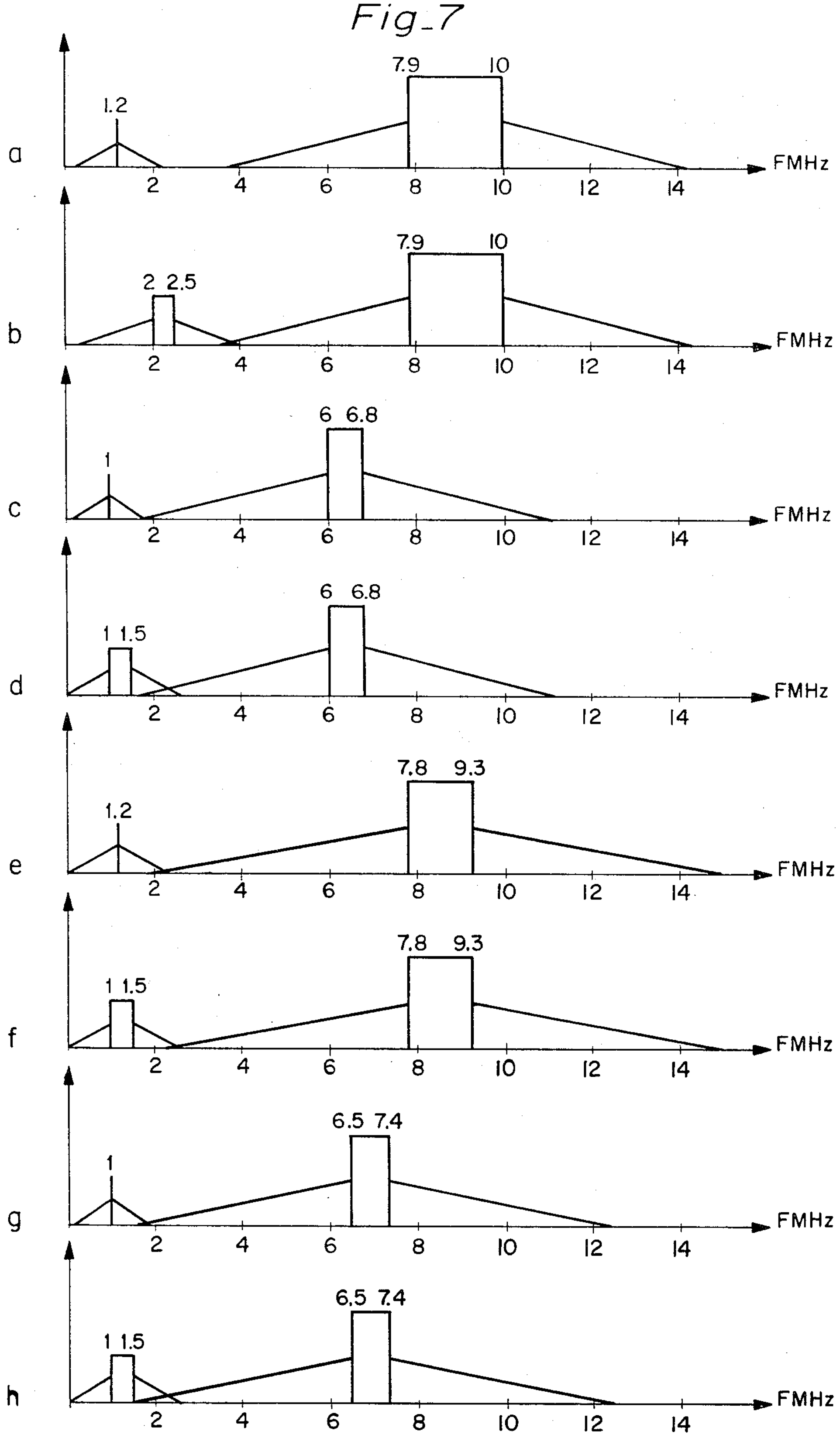
FIGS. 7*a* to *h* are spectrums on the record medium obtained with the various forms of systems under NTSC and PAL standards.

The spectrum of FIGS. **7*c* and *d* correspond to those of FIGS. 7*a* and *b***, respectively, except they are for the NTSC low band standard.

The spectrum of FIGS. **7*e*, *f*, *g*, and *h* correspond to the spectrum of FIGS. 7*a*, *b*, *c* and *d***, respectively, except that they are for the PAL standards rather than the NTSC standards.

Figure 8:
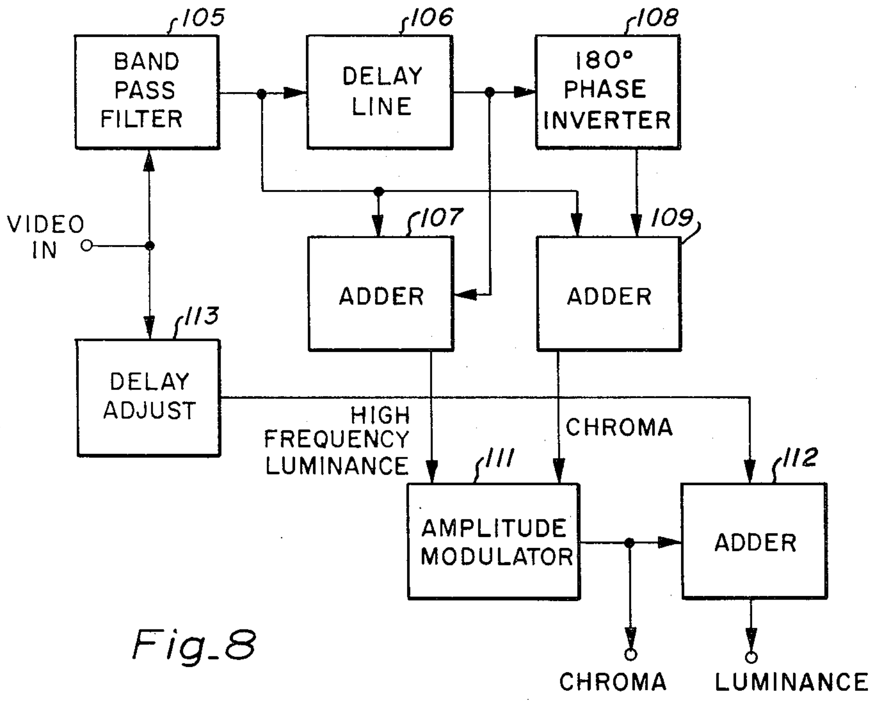
FIG. 8 is a block diagram of another form of comb filter for use in the quadrature modulation type systems under NTSC or PAL standards.

Referring to FIG. 8 there is shown another form of comb filter which may be utilized in the above systems for either the NTSC or the PAL standards. In the NTSC system, the video signal input is sent to the band pass filter 105 which has a band pass of roughly 2.7 to 4.2 MHz and functions to pass the chroma and high frequency luminance. The output is sent to a one scanning line delay circuit 106 and then to the adder 107 which receives on its other input the chroma and high frequency luminance directly from the filter 105. The two chroma signals are out of phase and therefore cancel in the adder 107, and the adder output is the high frequency luminance.

The delayed chroma and high frequency luminance from delay line 106 is phase inverted in circuit 108 and sent to one input of adder 109. The other input of adder 109 receives the chroma and high frequency luminance directly from filter 105 and the luminance signals in adder 109 are in phase opposition and cancel, giving a chroma signal output.

Due to slight errors in the timing, a small amount of high frequency luminance will appear on the output of adder 109, and, therefore, an amplitude modulator 111 is coupled to the outputs of the two adders 107 and 109. This amplitude modulator 111 will operate to reduce the signal amplitude whenever high frequency luminance appears on the output of adder 109, and the output of the modulator is chroma, the modulator having a very high rejection for the luminance due to this non-linear effect.

The chroma signal is added in adder 112 to video signal which has been slightly delayed by delay circuit 113 to balance the delay of the band pass filter, the chroma cancelling in adder 112 to give only the luminance signal output with a low K factor, e.g. 1.5 percent, and chroma rejection in the order of 40*db*.

In the PAL system, the delay of delay line 106 is two scanning lines. The delay of the adjustment circuit 113 may be either the delay of the band pass filter 105 or the delay of the band pass filter 105 plus the delay of one scanning line.

Figure 9:
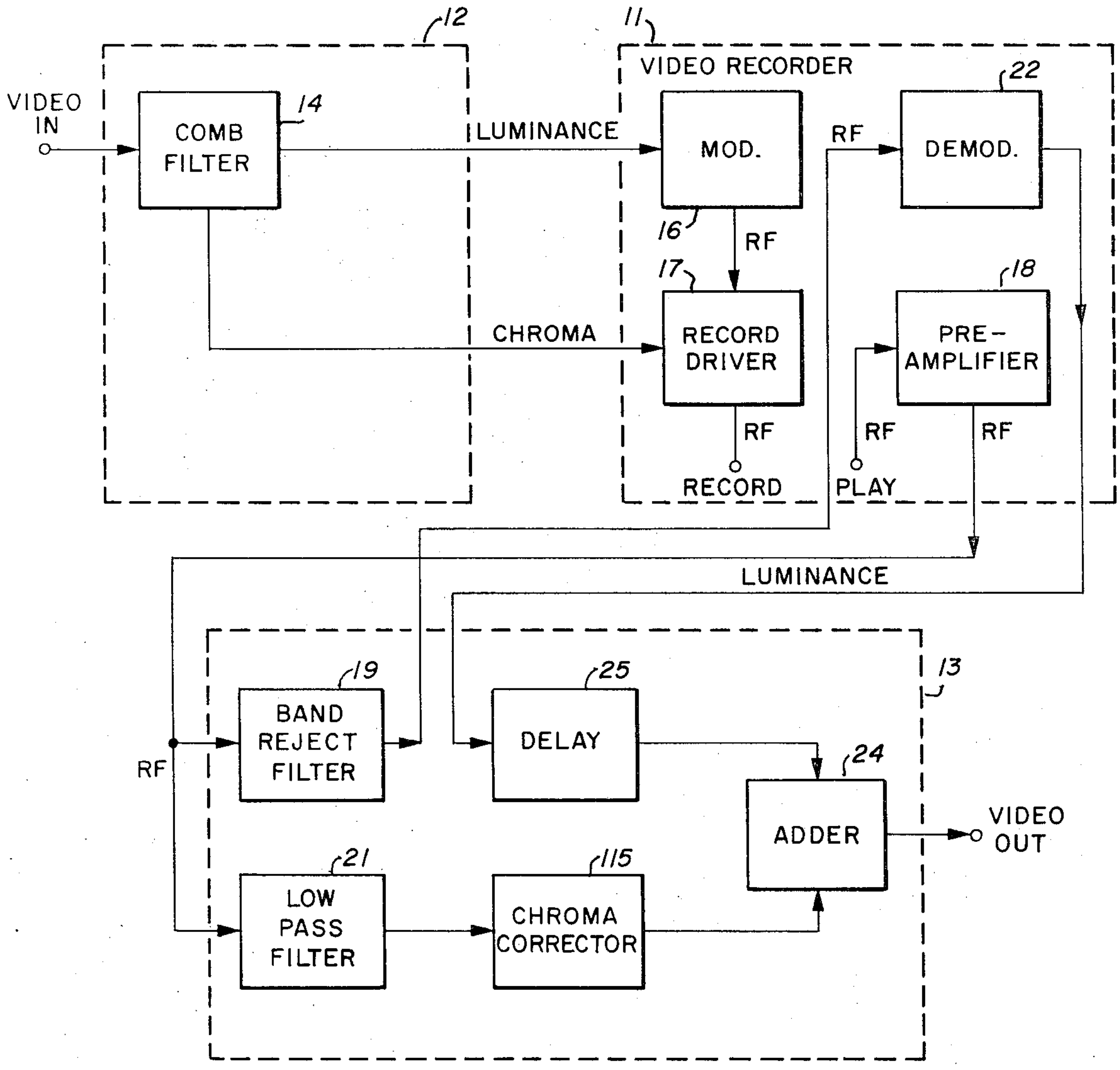
FIG. 9 is a block diagram of another embodiment of the present invention wherein the chroma is recorded directly on the record medium without transcoding.

Referring to FIG. 9 there is shown a system which operates in the same manner as FIG. 1 described in full above, except that the chroma information is recorded directly without first passing through a transcoding stage. The luminance is sent to the standard modulator 16 and the chroma signal is transmitted to the record driver stage 17 where it is added to the RF FM modulated by the luminance signal from the modulator 16. As before, the chroma uses the lower end of the spectrum and the luminance uses the upper end of the spectrum, however frequencies below 2.5 to 3MHz are not utilized.

In playback, the chroma is recovered by the low pass filter 21, then corrected as far as time base errors are concerned by a known form of chroma correction circuit 115.

Figure 10:
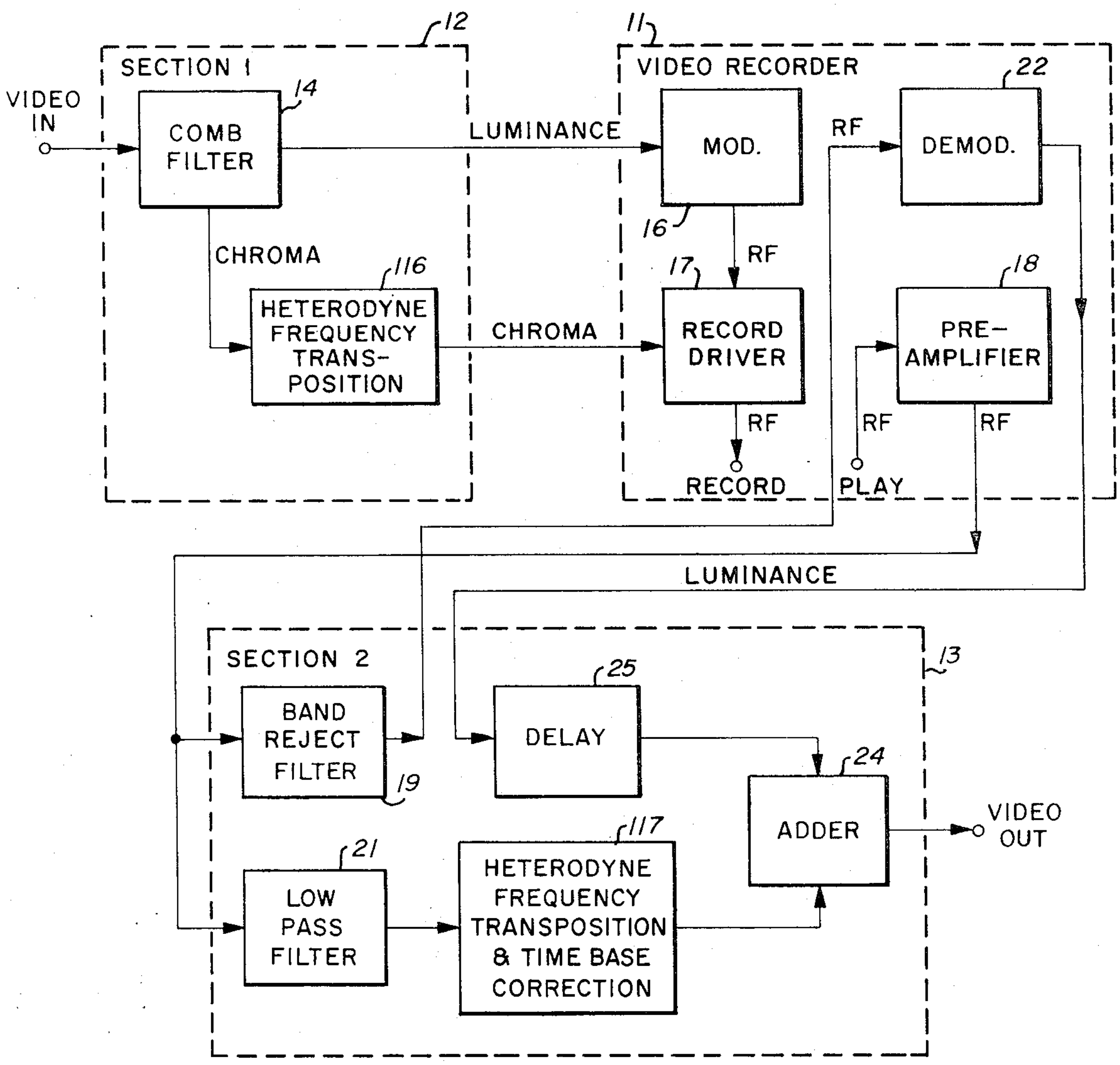
FIG. 10 is a block diagram of another embodiment of the invention wherein transcoding in the recording and playback units is accomplished by heterodyne frequency transposition.

Referring now to FIG. 10, the system shown therein operates similarly to that shown in FIG. 1 except that the chroma information is transposed in frequency by heterodyning in circuit 116 before transmission to the record driver 17. In play back, the chroma is recovered in low pass filter 21 and sent to the heterodyne transposition circuit 117 to transpose the chroma back to its original form and also tocorrect chroma time base errors by use of an oscillator which is phase locked to the recorded (playback) chroma so that oscillator phase shifts match and cancel chroma phase shifts.

It is noted that in the above embodiments, the chroma signal is recorded on the low end of the spectrum and separated from the luminance. It will be immediately apparent to one skilled in the art that the chroma signal may be applied on the upper end of the spectrum without departing from the scope of this invention.

What is claimed is:

1. A color video recording system comprising a video recorder including a record driver means for recording incoming video signals on a magnetic record medium, an input signal processing circuit comprising a comb filter for separating the chroma signal from the luminance signal in the incoming video signal, means coupling said comb filter to said record driver means for recording the luminance signal on one portion of the RF spectrum of the record medium, means coupling said comb filter to said record driver means for recording the chroma signal on another portion of the RF spectrum of the record medium separate from said one portion, and a playback signal processing circuit coupled to said video recorder comprising means for recombining the luminance signal from the one portion of the RF spectrum of the record medium with the chroma signal from the other portion of the RF spectrum of the record medium to produce a reconstituted video output signal.

2. A video recording system as claimed in claim 1 wherein said means for recording the luminance signal operates to record said signal on the higher frequency portion of said RF spectrum and said means for recording the chroma signal operates to record said signal on the lower frequency portion of said RF spectrum.

3. A video recording system as claimed in claim 2 wherein said means for recording said chroma signal comprises a transcode circuit for changing the frequency band and color coding of said chroma signal, and said recombining means comprises a low pass filter and a transcode circuit for reconverting said recorded low frequency RF chroma signal to its original form for recombining with the playback luminance signal.

4. A color video recording system as claimed in claim 3 wherein said transcode circuit in said recording means comprises a quadrature modulation circuit for producing a quadrature modulation signal output to said record driver and said transcode circuit in said recombining means comprises a quadrature demodulation circuit.

5. A color video recording system as claimed in claim 4 wherein the subcarrier of the recorded chroma signal is equal to an odd number of a quarter of the horizontal scanning line frequency.

6. A color video recording system as claimed in claim 3 wherein said transcode circuit in said recording means comprises a line sequential modulation circuit and said transcode circuit in said recombining means comprises a line sequential demodulation circuit.

7. A color video recording system as claimed in claim 6 wherein said line sequential modulation is FM modulation.

8. A color video recording system as claimed in claim 1 wherein said means for recording said chroma signal comprises a heterodyne frequency transposition circuit for transposing the frequency of said chroma signal.

9. Apparatus for processing an incoming color video signal for recording on the magnetic medium of a video recorder, said video recorder including a record driver means, comprising a comb filter for separating the chroma signal and the luminance signal, circuit means coupling said comb filter to said record driver to transmit said luminance signal to said recorder for recording on one portion of the RF spectrum of the record medium, and a transcoding circuit coupling said comb filter to said record driver for changing the frequency band and the color coding of said chroma signal, said transcoded chroma signal being transmitted to said recorder for recording on another portion of the RF spectrum.

10. The apparatus of claim 9 including means for playing back said recorded luminance and chroma signals from said record medium comprising means for recombining the luminance signal from the one portion of the RF spectrum of the record medium with the chroma signal from the other portion of the RF spectrum to produce a reconstituted video output signal, said recombining means including a low pass filter and a transcode circuit for reconverting said recorded RF chroma signal to its original form for recombining with the play back luminance signal.

11. The method of recording color video signals on the magnetic medium of a video recorder and playing back said video signals therefrom comprising the steps of comb filtering the incoming video signal to separate the chroma signal from the luminance signal, recording the luminance signal on one portion of the RF spectrum of the recorder medium, recording the chroma signal on the other portion of the RF spectrum of the recorder medium, and thereafter recombining the luminance signal from the one portion of the RF spectrum of the recorder medium with the chroma signal from the other portion of the RF spectrum of the recorder medium to produce a reconstituted video output signal.

12. The method as claimed in claim 11 wherein the step of recording said chroma signal on the one portion of said RF spectrum comprises the step of transcoding the incoming separated chroma signal to change the frequency band and the color coding of said chroma signal.

13. The method as claimed in claim 12 wherein said step of transcoding comprises quadrature modulation of said chroma signal.

14. The method as claimed in claim 13 wherein the step of transcoding comprises changing the subcarrier of the chroma signal to a frequency equal to an odd multiple of a quarter of the horizontal scanning line frequency.

15. The method as claimed in claim 12 wherein the step of transcoding comprises line sequential modulation of said chroma signal.

16. A color video system as claimed in claim 1 wherein the incoming video signal and the video output signal are in the NTSC form.

17. A color video system, as claimed in claim 1 wherein the incoming video signal and the video output signal are in the PAL form.

* * * * *